United States Patent [19]

Rockwood

[11] Patent Number: 5,499,901
[45] Date of Patent: Mar. 19, 1996

[54] BEARING FRAME CLEARANCE SEAL CONSTRUCTION FOR A PUMP

[75] Inventor: Robert E. Rockwood, Windham, N.H.

[73] Assignee: Environamics Corporation, Hudson, N.H.

[21] Appl. No.: 214,320

[22] Filed: Mar. 17, 1994

[51] Int. Cl.⁶ .................................................. F04D 29/12
[52] U.S. Cl. ........................ 415/111; 415/109; 415/168.2; 415/168.3; 415/229; 415/230; 417/423.11; 417/423.13; 277/53; 277/134
[58] Field of Search .................................. 415/109, 111, 415/112, 168.2, 174.5, 229, 230, 168.3; 417/423.11, 423.12, 423.13; 184/6.16, 6.26, 11.1, 11.2, 13.1; 277/53, 46.2, 134

[56] References Cited

U.S. PATENT DOCUMENTS

| | | |
|---|---|---|
| 2,005,429 | 6/1935 | Lichtenstein . |
| 2,373,609 | 4/1945 | Stahl . |
| 2,382,960 | 8/1945 | Compton et al. . |
| 2,386,505 | 10/1945 | Puchy . |
| 2,405,464 | 8/1946 | Storer, Jr. ............................ 277/53 |
| 2,485,537 | 10/1949 | Rae, Jr. . |
| 2,587,077 | 2/1952 | Winther . |
| 2,903,970 | 9/1959 | Elovitz et al. . |
| 2,984,505 | 5/1961 | Andresen et al. . |
| 3,027,165 | 3/1962 | Kempff et al. . |
| 3,083,972 | 4/1963 | Huddle . |
| 3,091,469 | 5/1963 | Matt . |
| 3,112,708 | 12/1963 | Kaufmann . |
| 3,115,097 | 12/1963 | Zagar et al. . |
| 3,122,375 | 2/1964 | Greenwald . |
| 3,168,871 | 2/1965 | Sieghartner .................... 415/168.2 |
| 3,515,497 | 6/1970 | Studebaker et al. . |
| 3,624,763 | 11/1971 | Rohr . |
| 3,655,295 | 4/1972 | Mitchell . |
| 3,923,416 | 12/1975 | Frey . |
| 4,300,842 | 11/1981 | Hold et al. .................... 415/168.3 |
| 4,388,040 | 6/1983 | Sakamaki ....................... 415/230 |
| 4,402,515 | 9/1983 | Malott . |
| 4,429,883 | 2/1984 | Nakanishi . |
| 4,439,096 | 3/1984 | Rockwood et al. . |
| 4,466,620 | 8/1984 | Orlowski ............................ 277/53 |
| 4,521,151 | 6/1985 | Frater et al. . |
| 4,565,378 | 1/1986 | Wehrfritz et al. . |
| 4,613,141 | 9/1986 | Heinen . |

(List continued on next page.)

FOREIGN PATENT DOCUMENTS

| | | |
|---|---|---|
| 1040304 | 10/1953 | France . |
| 2822499 | 11/1978 | Germany . |
| 0941683 | 7/1982 | U.S.S.R. . |
| 1656258 | 1/1991 | U.S.S.R. ............................ 277/53 |
| 1762065 | 9/1992 | U.S.S.R. ............................ 277/134 |
| 1366895 | 9/1974 | United Kingdom .................. 277/53 |

*Primary Examiner*—Edward K. Look
*Assistant Examiner*—Christopher Verdier
*Attorney, Agent, or Firm*—Myers, Liniak & Berenato

[57] ABSTRACT

A pump shaft clearance seal construction disposed adjacent a bearing frame (49, 51) for preventing lubricating fluid from migrating away from the bearing frame. The clearance seal construction includes a plurality of grooves (labyrinth or single spiral groove) defined in the exterior periphery of a rotating member disposed immediately adjacent the bearing frame, the rotating member and a corresponding stationary member defining a fluid sealing clearance passageway (63) in which the grooves are disposed. When the pump shaft (7) is rotated, the air flow created in the passageway (63) by the rotating grooves (73) deters the lubricating fluid from migrating away from the bearing frame (49,51). The passageway also includes a radially extending portion (69) in which a plurality of arc-shaped sealing vanes (103) are formed, the vanes (103) for creating a centripetal pumping/sealing action thereby preventing foreign contaminants from flowing radially outward into the radially extending portion (69) of the passageway toward the labyrinth grooves (73) and the adjacent bearing frame (49, 51). Accordingly, the seal construction functions to simultaneously both (i) prevent lubricating fluid from migrating away from the bearing frame; and (ii) preclude foreign contaminants from reaching the bearing frame and the lubrication chamber therebeyond.

13 Claims, 4 Drawing Sheets

U.S. PATENT DOCUMENTS

| | | |
|---|---|---|
| 4,688,806 | 8/1987 | Heilala . |
| 4,721,312 | 1/1988 | Hornberger ............................ 277/134 |
| 4,808,012 | 2/1989 | Otto ...................................... 277/134 |
| 4,813,689 | 3/1989 | Talter et al. . |
| 4,840,385 | 6/1989 | Senft et al. . |
| 4,881,829 | 11/1989 | Koelsch . |
| 4,889,039 | 12/1989 | Miller . |
| 4,890,941 | 1/1990 | Calafell, III et al. . |
| 4,900,039 | 2/1990 | Klecker et al. . |
| 4,915,579 | 4/1990 | Whittier et al. . |
| 5,011,166 | 4/1991 | Watts . |
| 5,158,304 | 10/1992 | Orlowski . |
| 5,174,583 | 12/1992 | Orlowski et al. . |
| 5,221,095 | 6/1993 | Orlowski . |
| 5,261,676 | 11/1993 | Rockwood . |

BEARING FRAME CLEARANCE SEAL CONSTRUCTION FOR A PUMP

BACKGROUND OF THE INVENTION

This invention relates to a clearance seal construction for a pump. More particularly, this invention relates to a clearance seal construction disposed adjacent a pump shaft bearing frame for preventing lubricating fluid from migrating away from the bearing frame.

Environmentally hazardous fluid such as acids, oils, and toxins which can cause serious harm to the environment often need to be pumped through fluid flow systems from one location to another. When pumping such dangerous flow materials, it is important that neither the liquid nor the gases which are often released by the liquid escape to the atmosphere or pump areas outside the desired fluid pumping path.

Environmentally safe pumps used in such situations typically include a motor for driving a pump shaft, the pump shaft being affixed at one end to a fluid pumping impeller assembly and at the other end to the motor output shaft. Conventional single and double row bearings (e.g. ball bearings) are typically disposed within a lubrication chamber adjacent the motor for rotatingly supporting the pump shaft and/or motor shaft. Such lubrication chambers generally circumferentially surround the pump shaft and define a lower well portion to be filled with lubricating oil or other conventional lubricating liquid.

Co-axially spaced bearing frames housing the aforesaid bearings are typically disposed within the lubrication chamber, one on either side thereof, as known in the art. These bearings provide for substantially frictionless rotation of the pump shaft while simultaneously supporting it against vibration. The purpose of the lubricating oil within the chamber is to lubricate the co-axially spaced bearings housed within their corresponding bearing frames. Such lubrication is desired in order to reduce the friction associated with rotation of the pump shaft and prolong the life of the pump's moving parts.

It is known to dispose seals adjacent such bearing frames so as to prevent lubricating fluid migration away from the bearings. See U.S. Pat. Nos. 4,420,515, 4,429,883, 4,840, 385, 5,158,304, and 5,174,583 just to name a few. The end result of such a migration/leakage could be a contaminated environment, excess fluid buildups in other parts of the pump, or contamination of the fluid being pumped. Additionally, if the lubricating fluid leaks out of the lubrication chamber, the bearings disposed therein are left without a means for lubrication thus leading to increased maintenance requirements and reduced operating life of the pump.

It is also known to provide a pump with a rotating clearance seal spaced axially along the pump shaft from the bearing frame. Typically, a bearing lock nut is disposed axially along the pump shaft between the bearing frame and the rotating seal. Such seals often include a rotating member affixed to the pump shaft and a stationary member circumferentially surrounding the radially exterior periphery of the rotating member, the rotating member having a plurality of labyrinth-type grooves defined therein for creating a sealing air flow between the members which prevents lubricating oil from migrating away from the bearing frame during rotation of the pump shaft and attached rotating member.

One drawback associated with the aforesaid clearance labyrinth-like seal construction is the amount of space it takes up axially along the pump shaft. Pumps often must be positioned in tight-fit places. So, the more compact the pump, the better. The aforesaid disposition of the bearing lock nut along the pump shaft axially between the bearing frame and the seal unfortunately increases the overall axial length of the pump. Also, the further away from the bearing frame the seal is disposed, the greater the volume of space therebetween for lubricating fluid to collect after it leaks through the bearing frame. This creates a problem because the amount of pressure put on the seal is a function of the amount/volume of fluid disposed adjacent thereto. In other words, the more fluid present in a chamber adjacent the seal, the harder it is for the seal to properly function.

Before discussing another drawback associated with such prior art labyrinth-type clearance seals, it is necessary to recognize that a problem also exists with respect to foreign materials entering the lubrication chamber by way of the bearing frame. Contaminants present exterior the lubrication chamber often make their way thereinto in the prior art. This leads to increased friction within the lubrication chamber and causes the moving parts therein (e.g. bearings) to wear out faster than otherwise. Additionally, such leakage into the lubrication chamber (and bearing frame) leads to quicker breakdown of the lubricating fluid and increased friction associated with rotation of the pump shaft. Accordingly, it is highly desirable to prevent foreign materials from leaking into the lubrication chamber and adjacent bearing frames.

The aforesaid prior art labyrinth-type clearance seals spaced axially from adjacent bearing frames are sometimes not strong enough to simultaneously or otherwise prevent both (i) lubricating fluid from migrating away from the bearing frames; and (ii) contaminants or foreign material from reaching the lubrication chamber or adjacent bearing frames.

It is apparent from the above that there exists a need in the art for a pump shaft seal construction having relatively few moving parts and a simple construction requiring little maintenance. Such a seal should also be compact in nature and strong enough to simultaneously both (i) prevent lubricating fluid from migrating away from an adjacent pump shaft bearing frame; and (ii) deter contaminants or other foreign materials from reaching the bearing frame.

It is the purpose of this invention to fulfill the above-described needs in the art, as well as other needs apparent to the skilled artisan from the following detailed description of this invention.

SUMMARY OF THE INVENTION

Generally speaking, this invention fulfills the above-described needs in the art by providing a clearance seal construction in a pump disposed adjacent a pump shaft bearing frame, the seal construction for preventing lubricating fluid from migrating away from the pump shaft bearing frame and comprising:

a clearance sealing passageway disposed immediately adjacent the bearing frame and circumferentially surrounding the pump shaft, the sealing passageway being defined between a seal rotating member affixed to the pump shaft for rotation therewith and a stationary member circumferentially surrounding the radially outer periphery of the rotating member, the rotating member affixed to the pump shaft adjacent and contacting the bearing frame for supporting the bearing frame against axial movement along the pump shaft;

a sealing groove defined in the radially outer periphery of the rotating member, the sealing groove creating a sealing air flow in the clearance sealing passageway when the rotating member is rotated along with the pump shaft; and wherein the sealing air flow prevents the lubricating fluid from migrating away from the bearing frame by way of the passageway.

This invention further fulfills the above-described needs in the art by providing a clearance seal construction in a pump for simultaneously preventing (i) lubricating fluid from migrating away from a pump shaft bearing frame, and (ii) foreign contaminants from leaking into or reaching the bearing frame, the clearance seal construction comprising:

a clearance sealing passageway disposed adjacent the pump shaft bearing frame, a first elongated portion of the sealing passageway being substantially parallel to and circumferentially surrounding a rotating pump shaft;

the first portion of the sealing passageway being defined by a stationary member and a sealing rotating member, the rotating member being annular in nature and affixed to the pump shaft for rotation therewith, the stationary member circumferentially surrounding the radially outer periphery of said rotating member;

at least one sealing groove defined in the radially outer periphery of the rotating member, the at least one sealing groove creating a sealing air flow in the first portion of the sealing passageway between the stationary member and the rotating member, said sealing air flow preventing the lubricating fluid from migrating away from the bearing frame via the passageway when the rotating member is rotated along with the pump shaft; and a second portion of the clearance sealing passageway extending radially with respect to the pump shaft and being substantially perpendicular relative to the first portion of the passageway, the rotating member defining a plurality of sealing vanes along the second portion of the sealing passageway, the vanes providing a centripetal pumping action for preventing passage of foreign materials or contaminants radially outward through the second passageway portion toward the first portion and the bearing frame when the pump shaft is rotated, the rotation of the vanes thereby preventing the foreign materials from passing through the sealing passageway and reaching the bearing frame.

This invention further fulfills the above-described needs in the art by providing a pump comprising:

a motor for driving a pump shaft;

an impeller affixed to the pump shaft, the impeller for pumping fluid from a fluid inlet to a fluid outlet;

a lubrication chamber circumferentially surrounding the pump shaft;

a bearing frame surrounding the pump shaft and disposed in the lubrication chamber, the bearing frame having a rotating portion affixed to the pump shaft and a stationary portion circumferentially surrounding the rotating portion, the stationary and rotating bearing frame portions housing a plurality of bearings therebetween;

a clearance seal construction disposed immediately adjacent the bearing frame, the seal construction for preventing lubricating fluid from migrating away from the bearing frame, the clearance seal construction comprising:

a clearance sealing passageway defined by a sealing rotating member affixed to the pump shaft for rotation therewith and a stationary member circumferentially surrounding the outer radial periphery of the rotating member, the rotating member being affixed to the shaft immediately adjacent and contacting the bearing frame so as to stabilize the bearing frame against axial movement along the pump shaft; at least one sealing groove defined in the outer periphery of the rotating member, the at least one sealing groove creating a sealing air flow in the sealing passageway when the rotating member is rotated along with the pump shaft; and wherein the air flow in the clearance sealing passageway prevents the lubricating fluid from migrating away from the bearing frame by way of the sealing passageway.

This invention will now be described with reference to certain embodiments thereof as illustrated in the following drawings.

DETAILED DESCRIPTION OF CERTAIN EMBODIMENTS OF THIS INVENTION

Referring now more particularly to the accompanying drawings in which like numerals indicate like parts throughout the several views.

Figure 1:
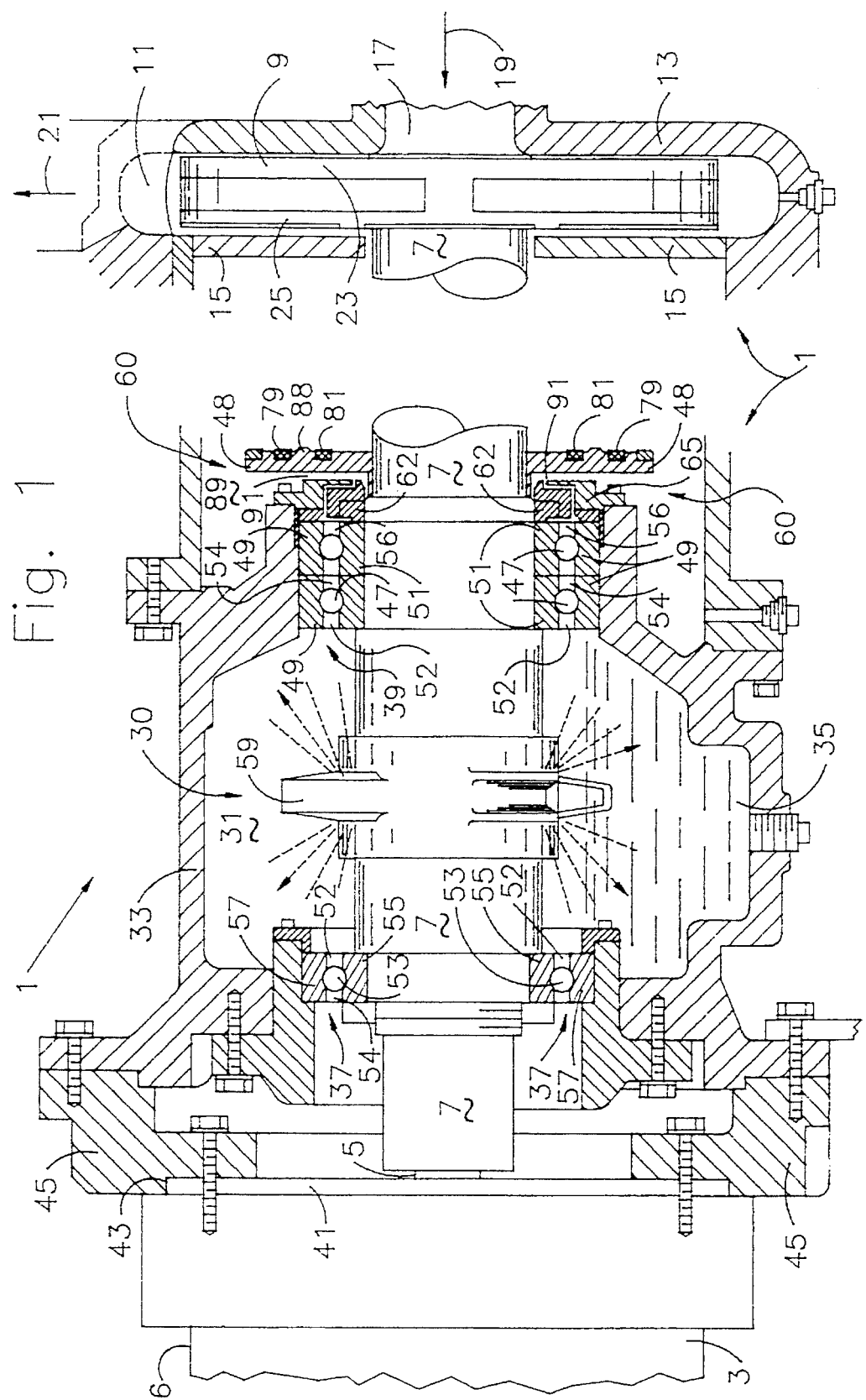
FIG. 1 is a longitudinal partial cross-sectional view of a pump including a clearance seal construction disposed adjacent a pump shaft bearing frame according to an embodiment of this invention.

FIG. 1 is a longitudinal cross-sectional view of a pump including a clearance seal construction according to an embodiment of this invention. Pump 1 is a hermetically sealed pump preferably used for pumping hazardous fluids such as acids, oils, and the like, but of course, may also be used for pumping non-hazardous fluids.

Pump 1 includes electric motor 3 (preferably hermetically sealed) enclosed within metallic motor housing/casing 6. Motor 3 includes drive shaft 5 which is coupled at one longitudinal end to pump shaft 7, pump shaft 7 being affixed at one end to impeller 9 and at the other end to motor drive shaft 5. In a preferred embodiment of this invention, an inert gas (e.g. nitrogen) may be introduced into motor housing 6 so as to hermetically seal the motor within the housing and prohibit the entrance of foreign materials or contaminants thereinto, with, of course, housing 6 being sealingly affixed to pump casings 33 and 45.

Impeller 9 of pump 1 is disposed in volute 11 formed by metal casing portion 13 and radially extending backplate 15. Volute 11 defines the pumping chamber having axial opening 17 defining a fluid inlet or inflow path 19, and a radially extending opening forming a fluid outlet or out-flow path 21. As the fluid to be pumped flows into volute 11 by way of fluid inlet opening 17, disk shaped rotating impeller 9 forces a substantial portion of the fluid radially outward through out-flow path 21, thereby pumping the fluid.

Impeller 9, which is, as shown, of the conventional closed type, is coaxially affixed to pump shaft 7 for rotation therewith and includes a pair of integrally formed circular facing plates 23 and 25, with a plurality of curved vanes (not shown) interconnecting plates 23 and 25. Alternatively, a conventional open type impeller can be used. Rear plate 25 of impeller 9 is threadedly attached to pump shaft 7 so as to rotate therewith when powered by motor 3. The structural details of impeller 9 and volute 11 are more thoroughly discussed in U.S. Pat. No. 5,261,676, and commonly owned co-pending U.S. Ser. No. 08/200,012, filed Feb. 22, 1994, the disclosures of which are hereby incorporated herein by reference.

Oil mister/lubrication assembly 30 is disposed axially along pump shaft 7 between motor 3 and impeller 9 in order to provide lubrication to the conventional rotary ball bearings which rotatably support pump shaft 7. Casing 33 defines lubrication chamber 31 which circumferentially surrounds pump shaft 7. Lubrication chamber 31 includes lower well 35 which is to be filled with a lubricating oil or other conventional lubricating fluid. Co-axially and spacedly mounted conventional rotating bearing assemblies, such as ball bearings, are illustrated generally at 37 and 39. Axially rearward most bearing assembly 37 is of the single row bearing type, while axially forward most bearing assembly 39 is of the double row type.

Double row bearing assembly 39, which is stronger than single row bearing assembly 37, is typically, in the prior art, disposed at a position closely adjacent the motor so as to counteract motor/pump shaft misalignment problems. However, according to this embodiment, double row bearing assembly 39 is positioned considerably axially forward of motor 3 because the problem of motor misalignment has been overcome by mounting forward axial end 41 of motor 3 in cut-away or recess area 43 defined in pump casing 45. The provision of double row bearing assembly 39 at a position closely adjacent sealing flange 48 and seal construction 60 reduces the amount of pump shaft vibration occurring in the quad seal area of pump shaft 7, the quad seal being made up of sealing flange 48 and another similar flange disposed axially forward of flange 47. This quad seal arrangement is more thoroughly described in aforesaid U.S. Ser. No. 08/200,012.

Accordingly, the provision of double row bearing assembly 39 more closely adjacent sealing flange 48 and seal 60 provides for added stabilization of the quad seal and seal 60 with respect to pump shaft vibration without increasing the overall axial length of the pump.

Each bearing row member of double row bearing assembly 39 includes a plurality of conventional sliding balls 47 housed within a corresponding bearing frame, each bearing frame having a stationary portion 49 affixed to casing 33 and a rotating portion 51 attached to pump shaft 7 for rotation therewith. In a similar manner, single row bearing assembly 37 includes a plurality of sliding balls 53 housed within a corresponding bearing frame, the bearing frame including annular rotating member 55 affixed to pump shaft 7 for rotation therewith and stationary portion 57 mounted to pump casing 33.

Lubricating fluid dispenser 59 is affixed to pump shaft 7 within lubrication chamber 31 so as to rotate along with pump shaft 7 when powered by motor 3. Dispenser 59 has a plurality of nozzles (not shown) formed therein for directing the lubricating liquid (e.g. oil) from well 35 in the form of a controlled flow of liquid or mist to bearing assemblies 37 and 39 disposed in chamber 31. Dispenser 59 and its lubricating fluid dispensing structure are more fully discussed in the aforesaid U.S. Pat. No. 5,261,676. In sum, dispenser 59 retrieves the lubricating fluid from well portion 35 of lubrication chamber 31 and directs it both radially and axially in the form of a mist or liquid flow toward bearing assemblies 37 and 39 disposed within chamber 31. In such a manner, the plurality of balls 47 and 53 disposed within bearing frame members 49, 51, 55, and 57, are continuously lubricated by way of the lubricating fluid when motor 3 is powering pump shaft 7.

This constant lubrication of the bearings provides for a substantially frictionless rotation of pump shaft 7 as supported by bearing assemblies 37 and 39. Due to this continuous lubrication, the bearing frames made up of rotating portions 51 and 55 along with stationary portions 49 and 57 continually house lubricating fluid therein along with their corresponding ball bearings. Inevitably, some of this lubricating fluid will leak axially around the plurality of balls 47 and 53 so as to make its way out of lubrication chamber 31. Such leaking is of course undesirable for the reasons discussed above.

Accordingly, we now turn to the clearance seal construction aspect of this embodiment. Seal construction 60 is disposed adjacent the bearing frames for the purpose of preventing the lubricating fluid of chamber 31 from leaking out of the chamber and migrating away from bearing frames 49, 51, 55, and 57.

Figure 2:
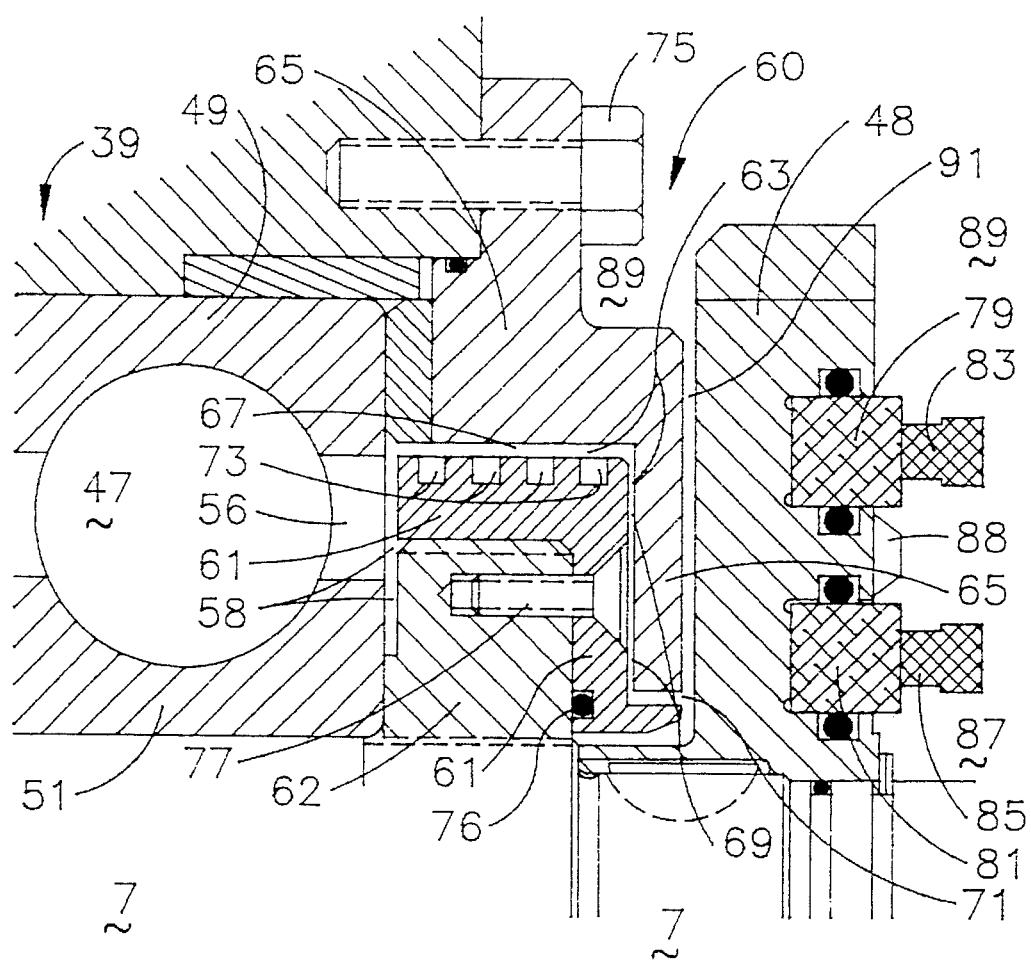
FIG. 2 is an enlarged longitudinal cross-sectional view of the clearance seal construction according to the embodiment of this invention shown in FIG. 1.

FIG. 2 is an enlarged cross-sectional view of the top half of clearance seal construction 60 according to this embodiment. While clearance seal construction 60 is shown herein as being disposed adjacent only frame members 49 and 51 of bearing assembly 39, it will be clearly understood by those of skill in the art that seal construction 60 may also be disposed adjacent bearing assembly 37 including frame members 55 and 57, but is not shown as such herein for purposes of simplicity.

As shown, rotating portion 51 of the row bearing frame most closely adjacent seal construction 60 is affixed to pump shaft 7 so as to rotate therewith, while stationary bearing frame member 49 circumferentially surrounds the radially outer periphery of member 51 so as to form annular gap 56 therebetween, gap 56 being disposed between bearings 47 and seal construction 60.

Lubricating fluid from well 35 will often leak axially toward seal 60 from lubrication chamber 31. This fluid typically makes its way around balls 47 and flows out of the bearing frame via gap 56 provided between stationary member 49 and rotating member 51. The lubricating fluid, after exiting the bearing frame via gap 56, meets clearance seal construction 60.

Seal construction 60, this first embodiment thereof best shown in FIG. 2, includes annular member 61 affixed to pump shaft 7 by way of annular bearing lock nut 62. Annular member 61 and nut 62 make up the seal construction's sealing rotating member. Accordingly, bearing lock nut 62 and annular member 61 of seal 60 rotate along with pump shaft 7 when powered by motor 3.

Clearance sealing passageway 63 of seal construction 60 is defined between rotating member 61 and annular stationary member 65. Sealing passageway 63 includes first portion 67 disposed immediately adjacent bearing frame 49, 51, wherein portion 67 is elongated in nature and extends axially away from lubrication chamber 31 in a manner substantially parallel to pump shaft 7. At the end of first portion 67 of sealing passageway 63, a second portion 69 of passageway 63 is defined between rotating member (61 and 62) and stationary member 65 of seal construction 60. Second portion 69 of passageway 63 extends radially with respect to pump shaft 7, and is substantially perpendicular relative to first passageway portion 67.

Sealing passageway 63 includes yet another segment, third portion 71, also defined between stationary member 65 and rotating annular member 61. As shown, passageway 63 is substantially "Z-shaped" in nature with first and third portions 67 and 71 being substantially parallel to one another and second portion 69 being perpendicular with respect to passageway portions 67 and 71.

Sealing passageway 63 is substantially annular in nature in that all three portions circumferentially surround pump shaft 7, as do rotating member 61, 62 and stationary member 65. A plurality of annular sealing grooves 73 are defined in the radially outer periphery of rotating member 61, grooves 73 preferably being separate and independent from one another thereby making up a labyrinth sealing arrangement. Alternatively, a single spiral shaped groove 73 could be formed in the exterior periphery of rotating member 61 instead of a plurality of separate and independent grooves.

This disposition of sealing passageway 63 immediately adjacent the bearing frame as by defining it along the radially outer periphery of sealing rotating member 61, 62, significantly reduces the overall axial length of pump 1 thereby enabling it to fit in more compact places.

When pump shaft 7 is rotated as powered by motor 3, the presence of groove(s) 73 in the radially exterior periphery of rotating member 61, 62 creates a sealing "air-flow" within the confines of first portion 67 of sealing clearance passageway 63. This air flow created by grooves 73 prevents the lubricating fluid which had leaked through the bearing frame including members 49 and 51 from migrating away from bearings 47 through passageway 63. The flux of air created in and adjacent first portion 67 of passageway 63 by the rotation of grooves 73, in effect, pushes the lubricating fluid back from passageway 63 toward ball 47 and lubrication chamber 31. Thus, passageway portion 67 forms a clearance-type seal.

When grooves 73 are formed so as to be separate, circular, and independent in nature (i.e. labyrinth clearance seal), the air flow created in passageway 63 is substantially radial in nature thereby creating a barrier for preventing the lubricating fluid from flowing therethrough. Alternatively, when groove 73 is made up of a single spiral groove winding toward bearings 47, the sealing air flow created by rotation of rotating member 61 and spiral groove 73 is screw-like in nature and creates a pumping action back toward the bearing frame and lubrication chamber 31. In other words, separate and independent grooves 73 form somewhat of a wall (labyrinth-type seal) against passage of bearing lubricating fluid, while a spiral groove 73, instead of forming a wall, creates a screw-like air-flow directed axially rearward toward bearing 47 and lubrication chamber 31. The type of groove 73 to be used, of course, depends largely on the specific application of the pump and seal construction 60 being used. The labyrinth seal is preferred in this FIG. 2 embodiment.

While sealing stationary member 65 is affixed to the pump casing as by conventional fastener 75, annular groove-containing rotating member 61 is affixed to bearing lock nut 62 as by, for example, conventional fastener 77. Alternatively, rotating seal member 61 could be attached to nut 62 by way of any conventional adhesive commonly used or known throughout the art, or be integrally formed therewith to form a rotating bearing frame supporting sealing member made up of a single integrally formed piece.

Annular rubber member 76 is provided between members 61 and 62 so as to prevent fluid from seeping therebetween.

Sealing flange 48 of an adjacent quad-seal arrangement, as more fully described in aforesaid Ser. No. 08/200,012, incorporated herein by reference, is affixed to pump shaft 7, flange 48 including annular sealing members 79 and 81 affixed thereto. Stationary annular sealing engaging members 83 and 85 create a rotating fluid sealing engagement with flange sealing members 79 and 81, respectively, when flange 48 is rotated along with pump shaft 7. The purpose of these seals is to prevent the often hazardous fluid being pumped from leaking axially rearward along pump shaft 7 from the wet or impeller end of pump 1 toward lubrication chamber 31 and motor 3.

The fluid being pumped in volute 11 may sometimes leak axially rearward from volute 11 to the point where it encounters the sealing engagement between rotating flange seal 81 and stationary engaging member 85. The fluid to be sealed against first reaches the radially inner peripheries of engaging member 85 and flange seal 81. The rotating seal created between members 81 and 85 seals the often hazardous fluid to be sealed against within elongated annular chamber 87 and prevents it from leaking radially outward along the front sealing face of flange 48.

The rotating sealing engagement between stationary engaging member 83 and rotating flange seal 79 functions in a similar manner. The structural details of flange 48, engaging members 83, 85, flange seals 79, 81, and temperature stabilizing liquid pumping vane 88 are more fully described in aforesaid Ser. No. 08/200,012.

If the fluid being pumped or some other foreign material or contaminant should leak through flange seals 79 and 81 and reach chamber 89, it will inevitably make its way axially rearward toward motor 3 along the radially outer periphery of flange 48 until reaching radially extending fluid passageway 91. The hazardous fluid or contaminant could then make its way radially inward through passageway 91 until reaching third portion 71 of sealing passageway 63 of clearance seal construction 60.

The sealing air flow created by rotation of groove(s) 73 of rotating member 61, while preventing lubricating fluid from migrating away from bearing frame 49, 51, also prevents the hazardous fluid being pumped and/or other foreign materials disposed in passageway 91 from making its way through passageway 63 toward lubrication chamber 31 and bearings 47, especially when plurality of grooves 73 form a labyrinth type clearance seal. When the fluid within passageway 91 reaches third portion 71 and second portion 69 of passageway 63 as shown in FIG. 2, the sealing groove created air flow within first portion 67 of passageway 63 prevents such fluid from flowing past second portion 69 into portion 67. In other words, the air flow created in first portion 67 of passageway 63 by the rotation of sealing grooves 73 simultaneously functions to prevent the escape of lubricating fluid from chambers 31 and 58, and the passage of foreign materials through passageway 63 toward chamber 31.

Figure 3:
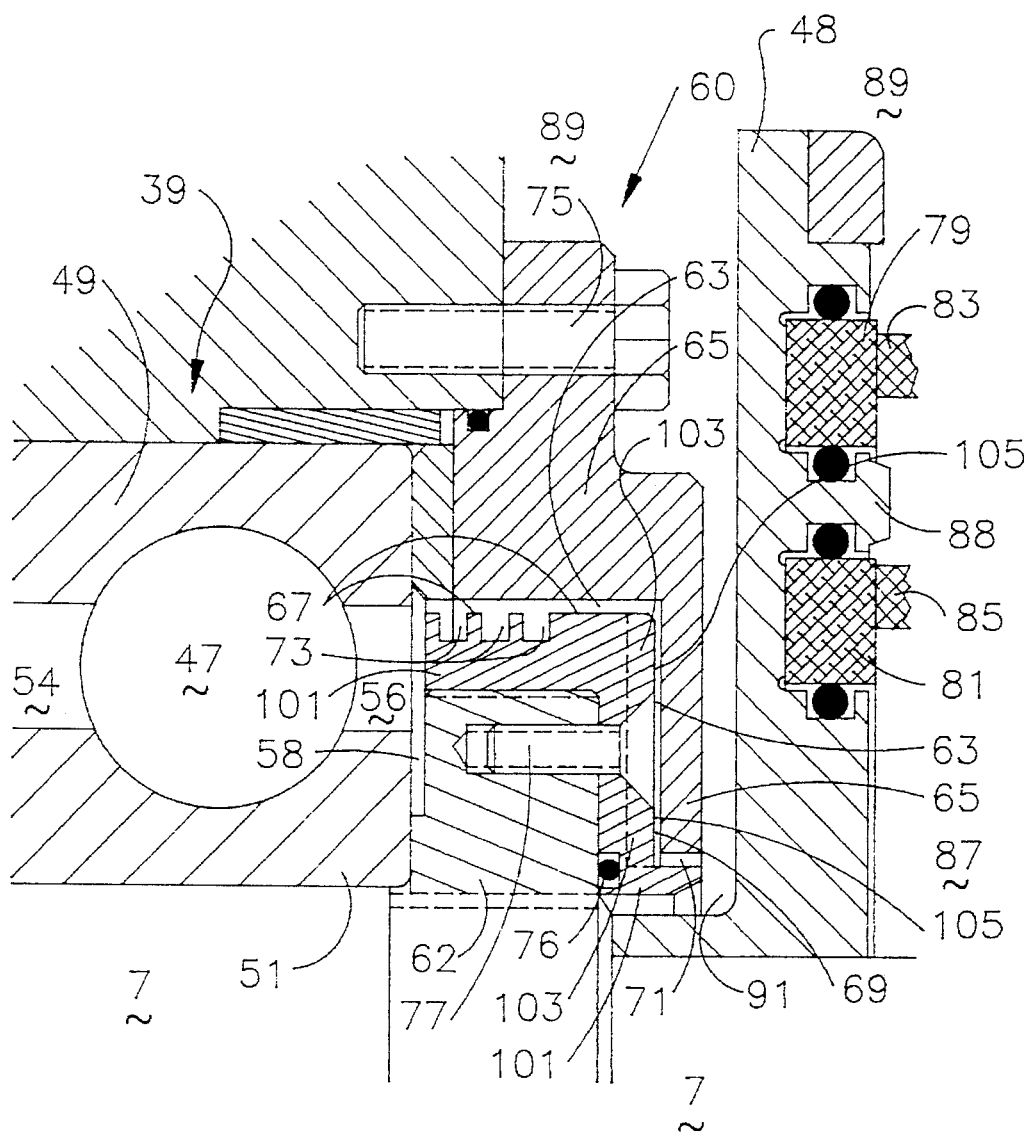
FIG. 3 is an enlarged longitudinal cross-sectional view of a clearance seal construction disposed adjacent a pump shaft bearing frame according to another embodiment of this invention.
Figure 4:
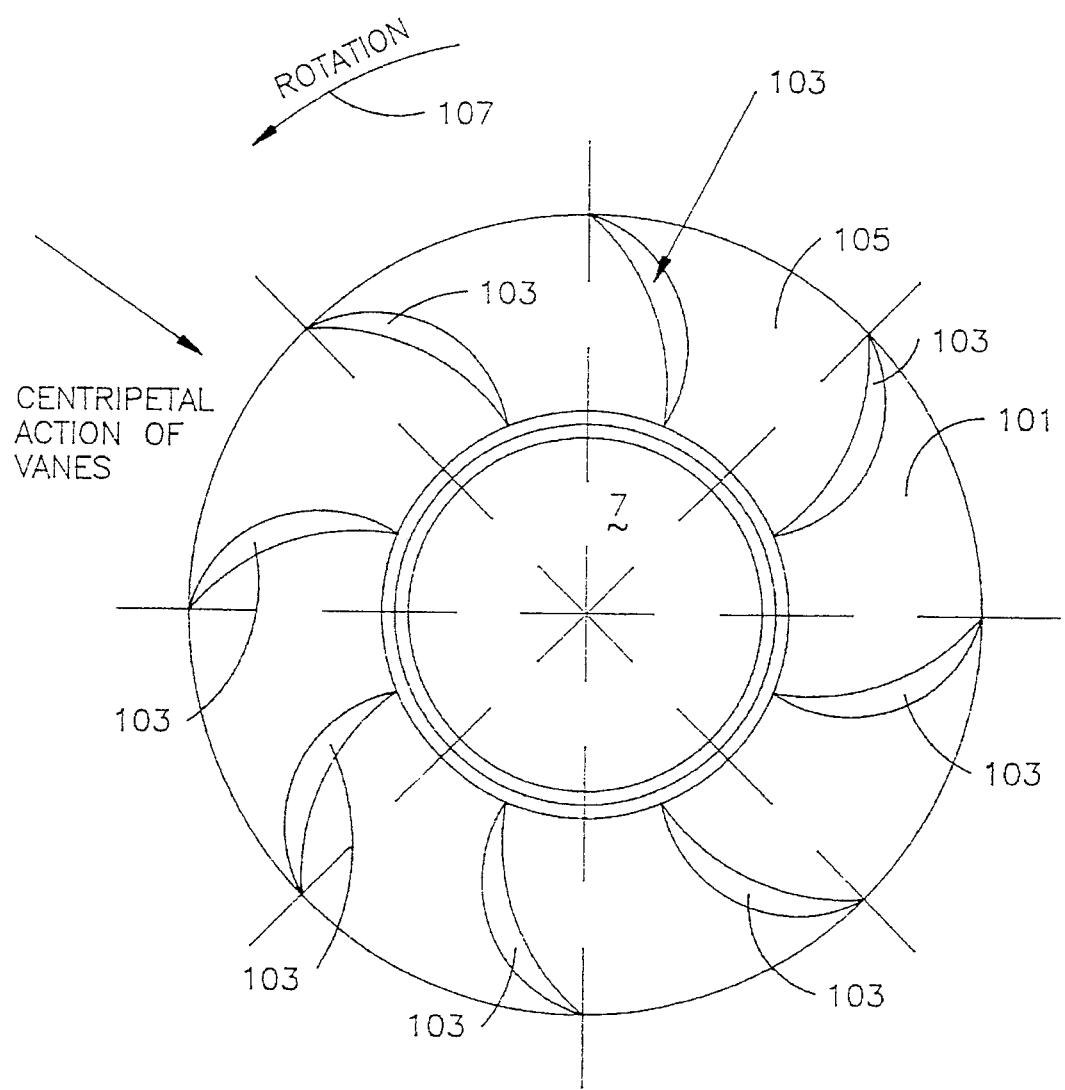
FIG. 4 is an enlarged front or end view showing the radially extending arc-shaped vane containing surface of the seal rotating member of the FIG. 3 embodiment of this invention as viewed from the wet or impeller end of the pump.

This brings us to another embodiment of this invention shown in FIGS. 3–4. FIG. 3 is an enlarged partial longitudinal cross-sectional view of a clearance seal construction according to another embodiment of this invention. The principal difference between this embodiment and the previous embodiment of this invention is the structural design of the sealing rotating member (including the nut and adjacent annular groove-containing portions).

Annular groove-containing rotating member 101 of this embodiment is affixed to bearing lock nut 62 as in the previous embodiment, this disposition of rotating member 101 along the radially outer periphery of nut 62 immediately or directly adjacent bearing frame 49, 51, providing a more compact bearing frame seal thus reducing the overall axial length of pump 1.

While groove-containing rotating member 61 of the previous embodiment defined spiral groove 73 or labyrinth grooves 73 as its sole sealing air flow creator, rotating member 101, 62 of this embodiment further includes the provision of a plurality of specially designed arc-shaped sealing vanes 103 in radially extending face 105 facing sealing flange 48. Arc-shaped vanes 103 defined in face 105 of rotating member 101 are more clearly shown in FIG. 4, which is a front or end elevational view of rotating member 101 surrounding pump shaft 7 as viewed from the impeller or wet end of pump 1.

As shown, there are preferably eight (8) separate and independent sealing vanes 103 defined in radially extending face 105 of groove-containing rotating member 101, these vanes preferably being spaced from one another around the circumference of face 105 in a symmetrical manner. The preferred rotating direction of pump shaft 7 and attached rotating member 101 as viewed from the wet end of pump 1 is also shown in FIG. 4 as being counterclockwise direction 107.

When arc-shaped vanes 103 along with pump shaft 7 are rotated in counterclockwise direction 107 as viewed from the wet end of pump 1, vanes 103 create, in second portion 69 of passageway 63, a centripetal pumping action or sealing air-flow which is directed radially inward toward pump shaft 7. This centripetal action in passageway 63 created by rotation of vanes 103 forces foreign materials or fluids (i.e. contaminants) out of second portion 69 of passageway 63 toward pump shaft 7 and ultimately through passageway portion 71 into passageway 91.

Thus, in this embodiment, rotating member 101, 62 is provided with two separate and distinct clearance sealing structures, one 73 for preventing the lubricating fluid from migrating away from bearing frame 49, 51 via passageway 63, and the other 103 for preventing foreign materials or contaminants present in passageway 91 and/or chamber 89 from reaching bearings 47 or lubrication chamber 31 by way of sealing passageway 63.

As shown, the number of grooves 73 (or the axial length of spiral 73) in this embodiment is preferably reduced with respect to the aforesaid embodiment of this invention. The reason for this is so that vanes 103 can be more easily and simply formed in rotating member 101.

Preferably, groove 73 in this FIG. 3–4 embodiment of this invention is of the spiral type for the following reasons. Spiral groove 73 pumps air back toward bearings 47, while a labyrinth arrangement of separate grooves 73 would create a radial sealing or barrier air flow in passageway 67. Accordingly, the labyrinth type 73 arrangement may well be better suited for simultaneously preventing leakage from both directions, while the spiral groove 73 arrangement is better suited for simply preventing fluid from migrating away from bearings 47. Because the seal construction of this embodiment is provided with separate means 103 for preventing foreign materials from reaching passageway 67 and ultimately bearings 47, groove 73 is preferably of the spiral type when used in combination with centripetal force creating vanes 103 because in this embodiment, groove 73 does not have to prevent contaminants from flowing toward bearings 47.

As shown in FIG. 4, arc-shaped vanes 103, while extending from the radially inner periphery of face 105 to the radially outer periphery thereof, do not extend therealong in a straight radial line. As shown, each vane 103 forms a curve or arc-like shape in extending radially outward on face 105. This design allows for the creation of the aforesaid centripetal pumping/sealing action within passageway 69 when rotating member 101 is rotated along with pump shaft 7 as powered by motor 3. It is of course important that member 101 be rotated in counterclockwise direction 107 when vanes 103 are designed as shown in FIG. 4. Alternatively, a clockwise rotation direction as viewed from impeller 9 would be acceptable if the design of vanes 103 was to be inverted from that shown in FIG. 4.

Furthermore, although not shown, the cross-section of each vane 103 as formed in face 105 of rotating member 101, is substantially rectangular in nature, vanes 103 and groove(s) 73 being, of course, formed in rotating member 101 in a conventional manner.

In a typical operation of the FIG. 3–4 embodiment of this invention, well portion 35 of lubrication chamber 31 is filled with a conventional lubricating fluid such as oil, preferably no higher than to the radially inner periphery of bearing frame members 49 and 57. When pump shaft 7 is rotated as by motor 3, dispenser 59 rotates therewith and distributes the lubricating fluid from well portion 35 toward coaxially mounted bearing assemblies 37 and 39 including bearings 47 and 53. The lubricating fluid, thrown by dispenser 59, makes its way into annular gaps 52 defined between inner and outer bearing frame members 51, 55, and 49, 57, respectively. By reaching annular gaps 52, the lubricating fluid comes into contact with conventional ball bearings 47 and 53 and lubricates their rotational movement as inner bearing frame members 51 and 55 rotate along with pump shaft 7 and outer bearing frame members 49 and 57 remain stationary.

Inevitably, some of the lubricating fluid will make its way from the chamber 31 side of ball bearings 47 and 53 to the opposing sides thereof. In other words, a portion of the lubricating fluid disposed within annular gaps 52 will make its way around balls 47 and 53 and flow into annular gaps 54 in bearing assemblies 37 and 39, annular gaps 54 also defined radially between the inner and outer bearing frame members. In the case of bearing assembly 37, after reaching gap 54, the fluid comes into contact with the clearance seal construction of this invention. However, for purposes of simplicity, this construction is not shown adjacent assembly 37.

In the case of double row bearing assembly 39, the lubricating fluid, after making its way into annular gap 54 disposed between spaced row ball bearings 47, will thereafter eventually make its way into gap 56 adjacent clearance seal construction 60, annular gap 56 of course being defined radially between the exterior radial periphery of inner bearing frame member 51 and the inner radial periphery of stationary bearing frame member 49.

After the lubricating fluid circumvents ball bearings 47 and reaches gap 56 within bearing frame 49, 51, it encounters seal construction 60. The lubricating fluid leaves gap 56 and flows into annular chamber 58, chamber 58 being disposed axially between gap 56 and sealing rotating member 62,101. Inevitably, some of the lubricating fluid disposed within annular chamber 58 will attempt to enter first sealing portion 67 of sealing passageway 63. However, the sealing air flow created within passageway portion 67 by the rotation of labyrinth or spiral grooves 73 prevents the lubricating fluid from doing so.

Turning now to the operation of the opposing side of seal construction 60 including centripetal action creating vanes 103, if the often hazardous fluid being pumped, upon reaching sealing flange 48 leaks radially outward through the rotating seal created between stationary engaging member 83 and flange sealing member 79 thus reaching chamber 89 and passageway 91, it eventually encounters third portion 71 of sealing passageway 63.

As the plurality of sealing vanes 103 defined in sealing rotating member 101 rotate along with pump shaft 7, preferably in the counterclockwise direction as viewed from the wet end of pump 1, a centripetal pumping/sealing action is created within radially extending sealing portion 69 of passageway 63. This centripetal force created by the rotation of specially designed vanes 103 forces fluid and/or other foreign materials radially inward through portion 69 and axially forward through third portion 71 of passageway 63 so as to prevent it from reaching portion 67, bearings 47, and lubricating chamber 31. Thus, the contaminants present in passageway 91 and chamber 89 are kept from traversing sealing passageway 63 due to the sealing air flow created therein by the rotation of sealing vanes 103.

In sum, seal construction 60 of the FIG. 3–4 embodiment, disposed directly or immediately adjacent bearing frame 49, 51 for example, performs two very important functions. Firstly, it prevents the lubricating fluid from leaving lubrication chamber 31 and bearing frame chambers 56 and 58, and secondly, it prevents foreign materials (i.e. contaminants) from reaching the bearing frame and/or lubrication chamber 31 and creating friction therein.

The above-described and illustrated elements of the various embodiments of this invention are manufactured and connected to one another by conventional methods commonly used throughout the art.

Once given the above disclosure, therefore, various other modifications, features or improvements will become apparent to the skilled artisan. Such other features, modifications, and improvements are thus considered a part of this invention, the scope of which is to be determined by the following claims:

I claim:

1. A clearance seal construction in a pump disposed adjacent a pump shaft bearing frame, said seal construction for preventing lubricating fluid from migrating away from said pump shaft bearing frame and comprising:

a clearance sealing passageway disposed immediately adjacent said bearing frame and circumferentially surrounding said pump shaft, said sealing passageway being defined between a seal rotating member affixed to said pump shaft for rotation therewith and a stationary member circumferentially surrounding the radially outer periphery of said rotating member, said rotating member affixed to said pump shaft adjacent and contacting said bearing frame for supporting said bearing frame against axial movement along said pump shaft;

a sealing groove defined in said radially outer periphery of said rotating member, said sealing groove creating a sealing air flow in said clearance sealing passageway when said rotating member is rotated along with said pump shaft;

wherein said sealing air flow prevents said lubricating fluid from migrating away from said bearing frame by way of said passageway;

wherein said bearing frame includes a radially inner rotating portion affixed to said pump shaft and a stationary radially outer portion circumferentially surrounding said inner rotating portion, said inner and outer portions housing a plurality of bearings therebetween, said bearings and said frame being disposed axially along said pump shaft between said sealing passageway and a bearing lubrication chamber housing said lubricating fluid; and wherein said seal rotating member comprises (i) an annular bearing nut positioned immediately adjacent and contacting said bearing frame, and (ii) an annular groove-containing member affixed to the radially outer periphery of said nut, said sealing groove being defined in said annular groove-containing member; wherein said nut is for maintaining the axial position of said radially inner rotating portion of said bearing frame relative to said lubrication chamber and said pump shaft, and said nut is disposed radially between said pump shaft and said sealing groove.

2. The seal construction of claim 1, wherein said clearance sealing passageway includes first and second elongated portions, said first portion (i) being immediately adjacent said bearing frame, (ii) containing said sealing groove, and (iii) extending axially along and substantially parallel to said pump shaft.

3. The seal construction of claim 1, wherein said second portion of said clearance sealing passageway extends substantially perpendicular with respect to said first portion.

4. The seal construction of claim 3, wherein said seal rotating and stationary members also define said second portion of said sealing passageway, said rotating member including a plurality of sealing vanes defined in a radially extending face thereof along said second portion of said clearance sealing passageway, said vanes creating a centripetal pumping or sealing action when said pump shaft is rotated for preventing the passage of fluid or other foreign materials radially outward through said second portion toward said first portion and said bearing frame, said centripetal action being directed radially inward toward said pump shaft.

5. The seal construction of claim 4, wherein said sealing passageway includes a third portion extending substantially parallel to said first portion and substantially perpendicular to said second portion, said second portion being disposed between and connecting said first and third portions.

6. The seal construction of claim 1, wherein said seal rotating member includes a plurality of independent said grooves defined therein, each extending circumferentially around said pump shaft along the radially exterior periphery of said rotating member so as to form a labyrinth-type clearance seal.

7. A clearance seal construction in a pump for simultaneously preventing (i) lubricating fluid from migrating away from a pump shaft bearing frame, and (ii) foreign contaminants from leaking into or reaching said bearing frame, said clearance seal construction comprising:

a clearance sealing passageway disposed adjacent said pump shaft bearing frame, a first elongated portion of said sealing passageway being substantially parallel to and circumferentially surrounding a rotating pump shaft;

said first portion of said sealing passageway being defined by a stationary member and a sealing rotating member, said rotating member being annular in nature and affixed to said pump shaft for rotation therewith, said stationary member circumferentially surrounding the radially outer periphery of said rotating member;

at least one sealing groove defined in said radially outer periphery of said rotating member, said at least one sealing groove creating a sealing air flow in said first portion of said sealing passageway between said stationary member and said rotating member, said sealing air flow preventing said lubricating fluid from migrating away from said bearing frame via said passageway when said rotating member is rotated along with said pump shaft; and a second portion of said clearance sealing passageway extending radially with respect to said pump shaft and being substantially perpendicular relative to said first portion of said passageway, said rotating member defining a plurality of sealing vanes along said second portion of said sealing passageway, said vanes providing a centripetal action for preventing passage of said foreign contaminants radially outward through said second passageway portion toward said first portion and said bearing frame when said pump shaft is rotated, said rotation of said vanes thereby preventing said foreign contaminants from passing through said sealing passageway and reaching said bearing frame.

8. The seal construction of claim 7, wherein said sealing rotating member includes a bearing locking portion disposed immediately adjacent and contacting a rotating portion of said bearing frame affixed to said pump shaft, said locking portion being affixed to said pump shaft for rotation therewith so as to stabilize the axial position along said pump shaft of said rotating portion of said frame, said locking portion being disposed radially between said pump shaft and said at least one groove defined in said rotating member; and wherein said at least one sealing groove is spiral in nature so as to create a sealing action directed toward said bearing frame.

9. A pump comprising:

a motor for driving a pump shaft;

an impeller affixed to said pump shaft, said impeller for pumping fluid from a fluid inlet to a fluid outlet;

a lubrication chamber circumferentially surrounding said pump shaft;

a bearing frame or housing surrounding said pump shaft and disposed in said lubrication chamber, said bearing frame having a rotating portion affixed to said pump shaft and a stationary portion circumferentially surrounding said rotating portion, said stationary and rotating bearing frame portions housing a plurality of bearings therebetween;

a clearance seal construction disposed adjacent said bearing frame, said seal construction for preventing lubricating fluid from migrating away from said bearing frame, said clearance seal construction comprising:

a clearance sealing passageway defined by a sealing rotating member affixed to said pump shaft for rotation therewith and a stationary member circumferentially surrounding the outer radial periphery of said rotating member, said rotating member being affixed to said shaft immediately adjacent and contacting said bearing frame so as to stabilize said bearing frame against axial movement along said pump shaft; at least one sealing groove defined in said outer periphery of said rotating member, said at least one sealing groove creating a sealing air flow in said sealing passageway when said rotating member is rotated along with said pump shaft; and wherein said air flow in said clearance sealing passageway prevents said lubricating fluid from migrating away from said bearing frame by way of said sealing passageway; and wherein said clearance sealing passageway includes first and second portions oriented substantially perpendicular with respect to one another, said at least one sealing groove being in said first portion and a plurality of centripetal action creating sealing vanes being defined in said second portion, said first portion extending substantially parallel to and surrounding said pump shaft.

10. The pump of claim 9, wherein said sealing rotating member comprises a bearing lock portion disposed immediately adjacent and contacting said rotating portion of said bearing frame, and an outer annular portion containing said at least one sealing groove surrounding the outer periphery of said lock portion, said lock portion for axially supporting said rotating portion of said bearing frame against axial movement along said pump shaft.

11. The pump of claim 10, wherein said at least one sealing groove is a single spiral groove for pumping said air flow axially toward said bearing frame, thus sealing said passageway against passage of said lubricating fluid.

12. The pump of claim 9, wherein said at least one sealing groove is spiral in nature and circumferentially surrounds said pump shaft, said spiral groove creating an air flow which pushes said lubricating fluid back toward said bearing frame away from said clearance seal construction.

13. The pump of claim 9, wherein said vanes create a centripetal action when said rotating member is rotated along with said pump shaft, said centripetal action pushing contaminants radially inward away from said first portion of said passageway and thus away from said bearing frame and said lubrication chamber.

* * * * *